United States Patent
Thangadorai

(10) Patent No.: US 9,043,395 B2
(45) Date of Patent: May 26, 2015

(54) METHOD AND SYSTEM FOR DELEGATING GROUP OWNERSHIP IN A WI-FI PEER TO PEER NETWORK

(75) Inventor: Kavin Kumar Thangadorai, Bangalore (IN)

(73) Assignee: Samsung Electronics Co., Ltd (KR)

( * ) Notice: Subject to any disclaimer, the term of this patent is extended or adjusted under 35 U.S.C. 154(b) by 479 days.

(21) Appl. No.: 13/434,249

(22) Filed: Mar. 29, 2012

(65) Prior Publication Data

US 2012/0278389 A1   Nov. 1, 2012

(30) Foreign Application Priority Data

Apr. 30, 2011  (IN) .............................. 1503/CHE/2011
Feb. 3, 2012  (IN) .............................. 1503/CHE/2011

(51) Int. Cl.
*G06F 15/16* (2006.01)
*H04W 84/20* (2009.01)
*H04W 8/00* (2009.01)

(52) U.S. Cl.
CPC .............. *H04W 84/20* (2013.01); *H04W 8/005* (2013.01)

(58) Field of Classification Search
None
See application file for complete search history.

(56) References Cited

U.S. PATENT DOCUMENTS

| | | | | |
|---|---|---|---|---|
| 5,634,011 | A * | 5/1997 | Auerbach et al. | 709/242 |
| 5,920,695 | A * | 7/1999 | Hathorn et al. | 709/208 |
| 7,260,716 | B1 * | 8/2007 | Srivastava | 713/163 |
| 8,204,230 | B2 * | 6/2012 | Schmidt et al. | 380/278 |
| 2003/0177219 | A1 * | 9/2003 | Taib et al. | 709/223 |
| 2003/0226013 | A1 * | 12/2003 | Dutertre | 713/163 |
| 2010/0180116 | A1 * | 7/2010 | Coan et al. | 713/168 |

* cited by examiner

*Primary Examiner* — John B Walsh
(74) *Attorney, Agent, or Firm* — The Farrell Law Firm, P.C.

(57) ABSTRACT

A method for exiting, by a peer owner, a Wireless Fidelity (Wi-Fi) peer-to-peer network including the peer owner and a plurality of client devices, and the Wi-Fi peer-to-peer network are provided. The method includes delegating ownership of the peer-to-peer network from the peer owner to a new owner from among said the plurality of client devices; and exiting the network after delegating the ownership to the new owner.

15 Claims, 7 Drawing Sheets

METHOD AND SYSTEM FOR DELEGATING GROUP OWNERSHIP IN A WI-FI PEER TO PEER NETWORK

PRIORITY

This application claims priority under 35 U.S.C. §119(a) to an Indian Provisional Patent Application filed in the Indian Intellectual Property Office on Apr. 30, 2011 as assigned Serial No. 1503/CHE/2011 and an Indian Patent Application filed in the Indian Intellectual Property Office on Feb. 3, 2012 and assigned Serial No. 1503/CHE/2011, the entire contents of each of which are incorporated by reference.

1. FIELD OF THE INVENTION

The present invention relates generally to Wireless Fidelity (Wi-Fi) Peer-to-Peer (P2P) networks, and more particularly, to delegation of ownership in Wi-Fi peer-to-peer networks.

2. DESCRIPTION OF THE RELATED ART

Along with developments in wireless technology, Peer-to-Peer (P2P) communications have emerged as a powerful means of data communication. A peer-to-peer (P2P) network allows wireless devices to directly communicate with each other. In P2P networks, the wireless devices within range of each other can discover and communicate directly with each other without requiring involvement of central access points. Such P2P communication is typically performed by two computers, so that the computers can connect to each other to form a network.

The Institute of Electrical and Electronics Engineers (IEEE) 802.11 standard offers two basic modes of operation: 1) an ad hoc mode and 2) an infrastructure mode. Wireless Local Area Network (WLAN) networks using the IEEE 802.11 standards are typically infrastructure based networks in which an Access Point is acting as a centralized entity controlling the access to a WLAN. Another mode of connection in a WLAN is IBSS (Ad-hoc) networking, in which the connection is performed between Wi-Fi enabled devices without requiring an infrastructure-like system.

Further, the Wi-Fi Alliance has published a new specification between Wi-Fi Peer devices called Wi-Fi Peer-To-Peer Specification, which essentially implements a software Access Point in a Peer device. According to the Wi-Fi Peer-To-Peer Specification, Wi-Fi clients such as computers, smart phones, printers, projectors are able to communicate with each other without requiring an Access Point.

A Wi-Fi P2P Group formed by a plurality of client devices called peers. A Group Owner in the Wi-Fi P2P Group is chosen by a negotiation process as described in Wi-Fi P2P specification. Once the P2P group is formed, new P2P peers or devices are able to identify the P2P Group or P2P devices through a P2P device discovery mechanism according to the Wi-Fi P2P specification.

In current P2P networks, if a group owner wishes to leave a group or to terminate the group session, there is no mechanism for maintaining the group and delegating the group ownership to another device in the group. Further, the Wi-Fi Peer-to-Peer (P2P) specification does not provide any mechanism for delegate the group ownership in a Wi-Fi Peer-to-Peer network. Due to this inability to delegate, in current P2P networks, when the group owner wishes to leave the group or to terminate the group session the group owner uses a de-authentication mechanism as per IEEE STD 802.11-2007. The de-authentication frame is broadcast to all connected P2P clients. After the P2P group session is terminated by the Wi-Fi P2P group owner, all P2P clients that were part of P2P group are not able to continue using the same session without the Group Owner. As a result, the entire group is lost.

Further, in order to re-create a group without the older group owner, the group ownership negotiation between P2P clients must be re-performed. The new P2P group will be established after the P2P group ownership negotiation procedure, Wi-Fi Simple Config (WSC) exchange and 4-way handshakes are completed. However, due to factors such as the significant overhead involved in group formation, this process of establishing a new group is repetitive and time consuming. Further, all other P2P clients that are interested in joining the group have to follow the P2P invitation procedure of Wi-Fi Peer-To-Peer specification and reconnect themselves.

Further, in current P2P networks, if a new device joins an already existing P2P group, there is no mechanism to determine whether the new device has capabilities that allow the new device to be better suited as group owner than the current group owner. As a result of this inability, the new device can only participate in the group as a new peer, even though it may have better capabilities than the present owner of the group. Due to this, the capabilities of the devices may be wasted.

As explained above, current P2P networks do not have the mechanism to delegate group ownership to a new device without the loss of the group. As a result, there is a need for a method for enabling a group owner to delegate his ownership to another device in the group based on its capabilities without having to reform the group. In addition, there is also a need for a method for delegating ownership to new devices joining the group, when such a new device possesses better capabilities than the current group owner.

SUMMARY OF THE INVENTION

An aspect of the present invention is to enable an existing owner in a peer-to-peer group to delegate ownership to another device. Another aspect of the present invention is to delegate ownership based on the device capabilities. Another aspect of the present invention is to enable the existing owner to send delegation information to the new device.

According to an aspect of the present invention, a method for exiting, by a peer owner, a Wireless Fidelity (Wi-Fi) peer-to-peer network including the peer owner and a plurality of client devices is provided. The method includes delegating ownership of the peer-to-peer network from the peer owner to a new owner from among said the plurality of client devices; and exiting the network after delegating the ownership to the new owner.

According to another aspect of the present invention, a Wireless Fidelity (Wi-Fi) peer-to-peer network is provided. The Wi-Fi peer-to-peer network includes a plurality of client devices; and an owner device for delegating ownership of the peer-to-peer network to a new owner from among the plurality of client devices before exiting the Wi-Fi peer-to-peer network.

BRIEF DESCRIPTION OF THE DRAWINGS

The above and other features and advantages of an embodiment of the present invention will be more apparent from the following detailed description taken in conjunction with the accompanying drawings, in which.

DETAILED DESCRIPTION OF EMBODIMENTS OF THE PRESENT INVENTION

Hereinafter, embodiments of the present invention are described in detail with reference to the accompanying drawings. In the following description and accompanying drawings, a detailed description of known functions or configurations incorporated herein may be omitted in order to avoid obscuring the subject matter of the present invention.

A method for enabling a group owner to delegate ownership of a group to another device in the group based on its capabilities without having to reform the group according to an embodiment of the present invention is described as follows. According to an embodiment of the present invention, the group owner may delegate the ownership to a new device outside the group.

Figure 1:
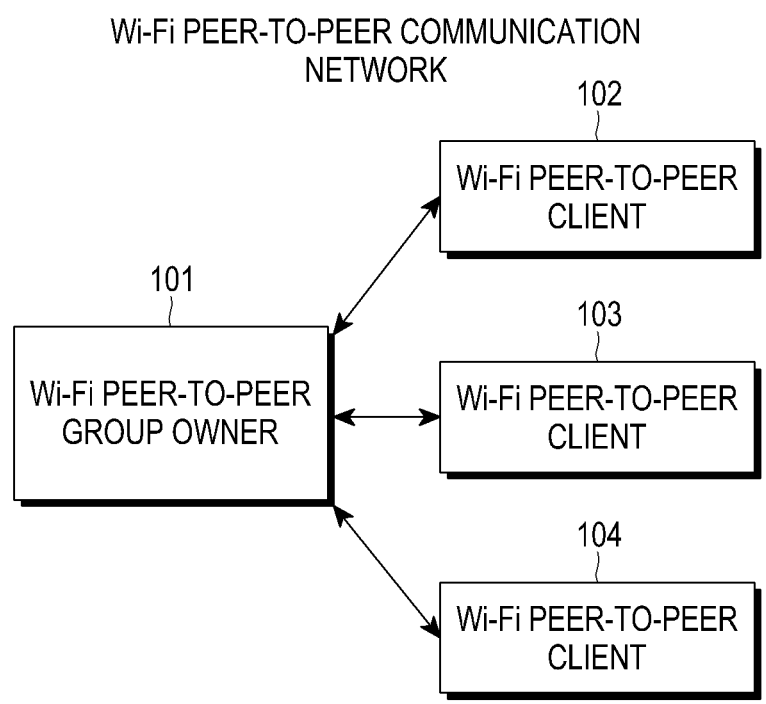
FIG. 1 is a block diagram illustrating a Wi-Fi peer-to-peer communication network, according to an embodiment of the present invention.

FIG. 1 illustrates the general block diagram of the Wi-Fi peer-to-peer communication network, according to an embodiment of the present invention.

Referring to FIG. 1, a Wi-Fi peer-to-peer network according to an embodiment of the present invention is an unmanaged network in which the Wi-Fi Peer-to-Peer client devices communicate with each other directly without requiring a centralized control point. This direct communication enables increased functionality in the network. The Wi-Fi P2P group owner 101 communicates with all the Wi-Fi P2P peer clients 102, 103, 104 without requiring access points. Although three peer clients are depicted in the example according to FIG. 1, the Wi-Fi P2P group owner 101 may communicate with any number of Wi-Fi P2P client devices in accordance with embodiments of the present invention.

Herein, the Wi-Fi P2P client device according to embodiments of the present invention may be a mobile device, a tablet, a camera, a television, laptop, etc. These devices are Wi-Fi enabled devices that communicate among each other in the P2P network.

Embodiments of the present invention may also be applied to devices enabled with WiMax or any other wireless standard, and such devices may communicate amongst each other in ad-hoc or infrastructure based networks.

Figure 2:
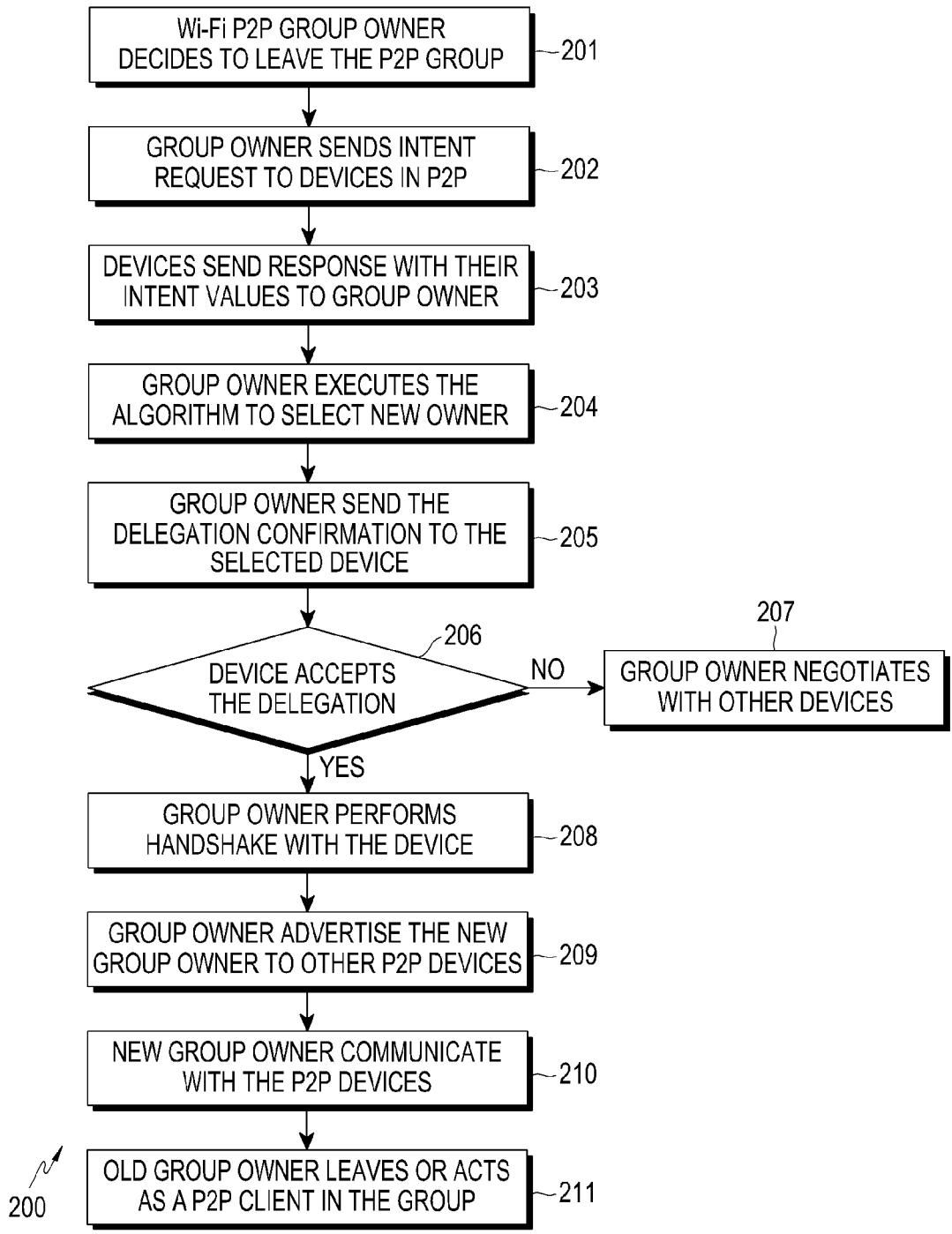
FIG. 2 is a flowchart that illustrating a group owner delegation process in a P2P network according to an embodiment of the present invention.

FIG. 2 is a flowchart illustrating a group owner delegation process in a P2P network according an embodiment of the present invention.

Referring to FIG. 2, upon a determination that the Wi-Fi P2P group owner will leave a P2P group and delegate ownership of the group to another client device in the P2P group, in step 201, the group owner sends, in step 202 intent request to all other devices in P2P group. Upon receiving the intent request from the group owner, in step 203, the other devices send responses with their respective intent values to the group owner. The intent value sent by each of the other P2P devices may be based on details such as cross connections, services offered, device capabilities, etc. After receiving intent values from the other devices, the group owner executes an algorithm to select the new group owner from among the other P2P devices, in step 204. Once the current group owner selects upon a new group owner, the current group owner sends a delegation confirmation to the selected device. Upon receiving the delegation confirmation from the existing group owner, the selected device accepts or rejects the delegation confirmation in step 206. If the selected device rejects the delegation confirmation, the current group owner negotiates with other devices in step 207. If the selected device accepts the delegation confirmation, the current group owner performs a handshake with the selected device, in step 208. The current group owner also sends out information indicating the new group owner to other P2P devices in step 209. The new group owner communicates (210) with the P2P devices. Upon delegating the group ownership, the current group owner, which has become the old group owner, may either leave the group, or may remain in the group as a non-owner P2P client. Various actions performed in the method of FIG. 2 may be performed in the above-described order, in a different order or simultaneously. Further, according to some embodiments of the present invention, some actions listed in FIG. 2 may be omitted.

According to an embodiment of the present invention, the group owner may transfer information related to Dynamic Host Configuration Protocol (DHCP) server details, a peer-to-peer Device and Interface address, a group id, a client state, etc., to the new group owner upon delegation of ownership.

Figure 3:
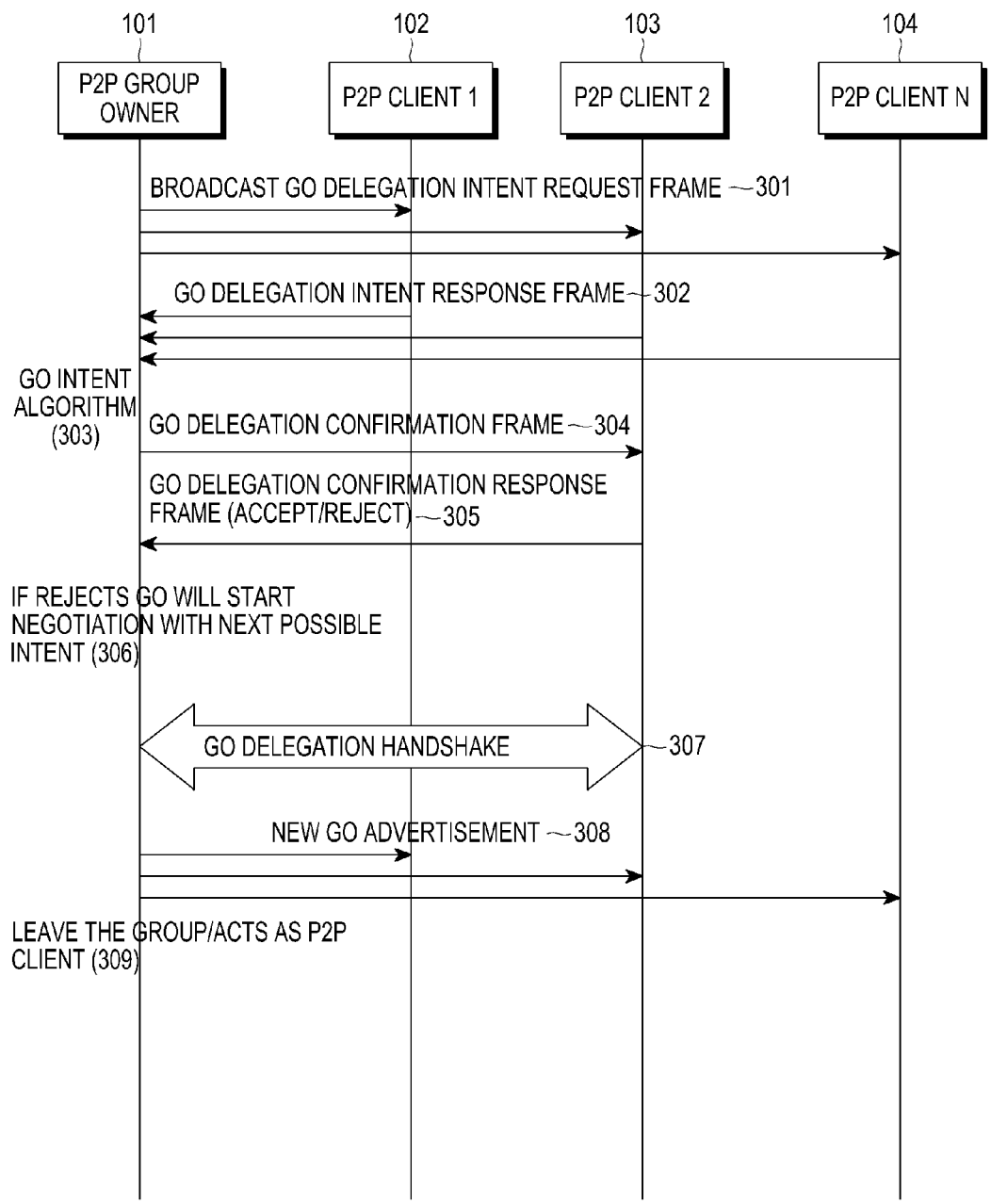
FIG. 3 is a diagram illustrating P2P group ownership delegation process within a P2P group according to an embodiment of the present invention.

FIG. 3 illustrates the P2P group ownership delegation process within a P2P group, according to an embodiment of the present invention.

Referring to FIG. 3, the group owner 101 starts delegation of the ownership to any of the other devices within the P2P network by broadcasting a group owner delegation intent request frame to the other P2P devices in step 301. After receiving the intent request frame from the group owner 101, devices in the P2P network send a group owner delegation intent response frame to the group owner 101, in step 302. The group owner 101 determines a new group owner by executing an intent algorithm based on the received intent value responses, which include information indicating services offered by and/or capabilities of the other devices. After the group owner 101 selects the new group owner based on the intent values and the algorithm, and the group owner sends a delegation confirmation frame to the selected device in step 304. The selected device 103 sends the group owner delegation confirmation response frames indicating either an acceptance or rejection of the group owner confirmation. According to an embodiment of the present invention, if the selected device 103 rejects group owner confirmation, the group owner starts negotiating with next possible new group owner, in step 306. According to another embodiment of the present invention, if the selected device 103 accepts the confirmation, the group owner 101 performs a delegation handshake with the selected device, in step 307. The old group owner 101 then sends new group owner advertisements to other devices in the P2P group. After delegation of ownership the old group owner 101 may either leave the group or remain in the group as another non-owner P2P client in step 309. The new group owner 103 communicates with all the P2P devices in the group.

Figure 4:
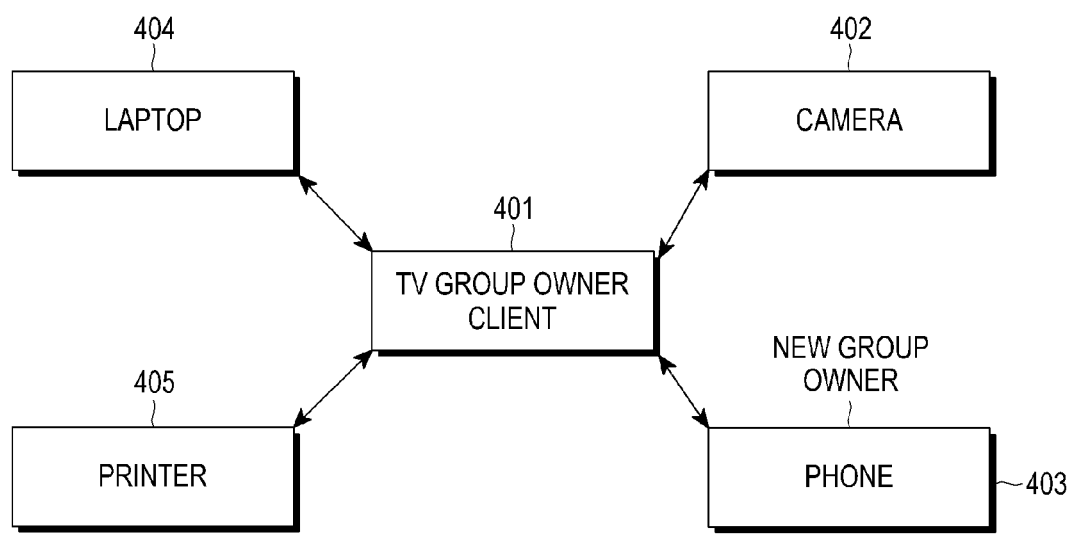
FIG. 4 is a diagram illustrating an example of devices communicating in a P2P network according an embodiment of the present invention.

FIG. 4 is a diagram illustrating an example of devices communicating in a P2P network according to an embodiment of the present invention.

Referring to FIG. 4, TV 401 is a group owner and communicates with other devices in a peer-peer network. The other devices in the network include a camera 402, a phone 403, a laptop 404, and a printer 405. The devices in a P2P network according to embodiments of the present invention are not limited to only the abovementioned devices, but may include any other devices enabled to perform Wi-Fi P2P communications. According to an embodiment of the present invention, upon a determination to leave the group, the TV 401 group owner sends a delegation intent to the other devices such as the camera 402, the phone 403, the laptop 404, and the printer 405. Each of these other devices sends an intent response to the TV 401. Upon receiving the intent responses, the TV 401 executes an intent algorithm to select a new group owner. In the present example, the TV 401 selects the phone 403 as the next group owner based on the intent value of phone 403. The TV 401 sends the delegation confirmation to the phone 403. Thus, the phone 403 now acts as a new group owner and communicates with the other devices. The TV 401 may either leave the group or choose to remain in the group as a non-owner client device in the group. According to an embodiment of the present invention, the TV 401 acts as another device in the same group and the new group owner phone 403 communicates with the TV 401, the camera 402, the laptop 404, and the printer 405.

Figure 5:
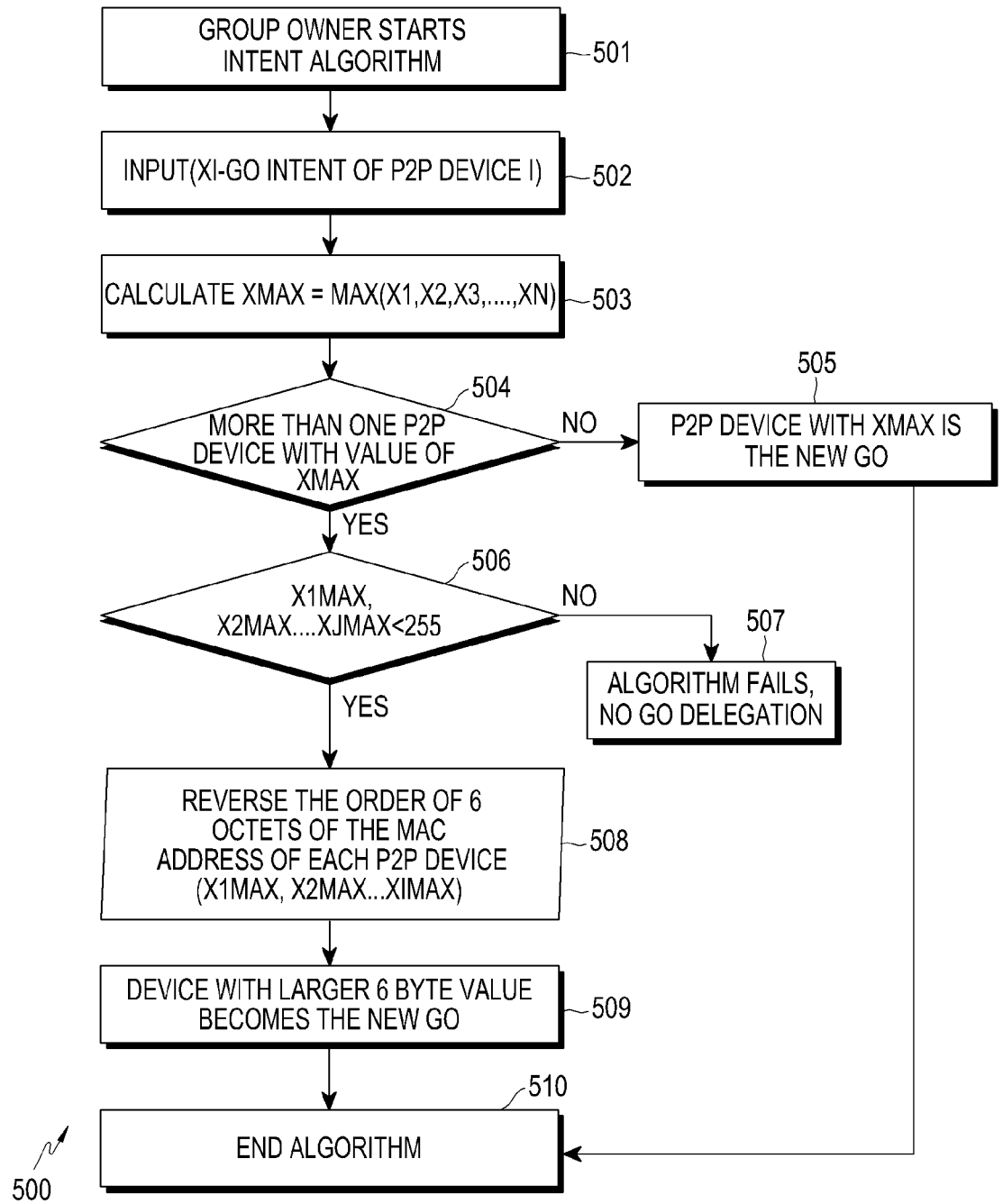
FIG. 5 is a flowchart illustrating a group owner intent algorithm according to an embodiment of the present invention.

FIG. 5 is a flowchart illustrating a group owner intent algorithm according to an embodiment of the present invention.

Referring to FIG. 5, the group owner starts the intent algorithm to select a new group owner among the P2P devices, in step 501. The group owner inputs the intent values $X_1, \ldots, X_N$ of each P2P device. The intent values range from 0x00 to 0xFF, in which 0xFF is the highest possible intent (excluding a tie breaker bit field), in step 502. The algorithm then determines a maximum from among the intent values (Xmax) in order to find the device with higher capabilities and/or ability to offer uninterrupted services, and selects such a device as the new group owner, in step 503. In step 504, the algorithm checks whether there is more than one P2P device with the value of Xmax in the P2P network. If the group owner finds more than one device with the value of Xmax, in step 506, the algorithm checks whether the intent value of these devices is less than 255. If the intent values are at least equal to 255, then no group owner delegation is performed, the algorithm ends. However, if the intent values of devices are less than 255, then the algorithm reverses the order of 6 octets of the Media Access Control (MAC) address of each P2P device, in step 508, to determine the new group owner. The MAC address, also known as physical address or a Local Area Network (LAN) address is a code of 48 bits (6 bytes) uniquely assigned to each network device. Using the MAC address, the algorithm determines the new group owner based on the device with larger 6 byte value in step 509. In step 510, the group owner selects the new group owner and ends the algorithm. The various actions in method of FIG. 5 may be performed in the order presented, in a different order or simultaneously, in accordance with embodiment of the present invention. Further, in some embodiments of the present invention, some actions listed in FIG. 5 may be omitted.

Figure 6:
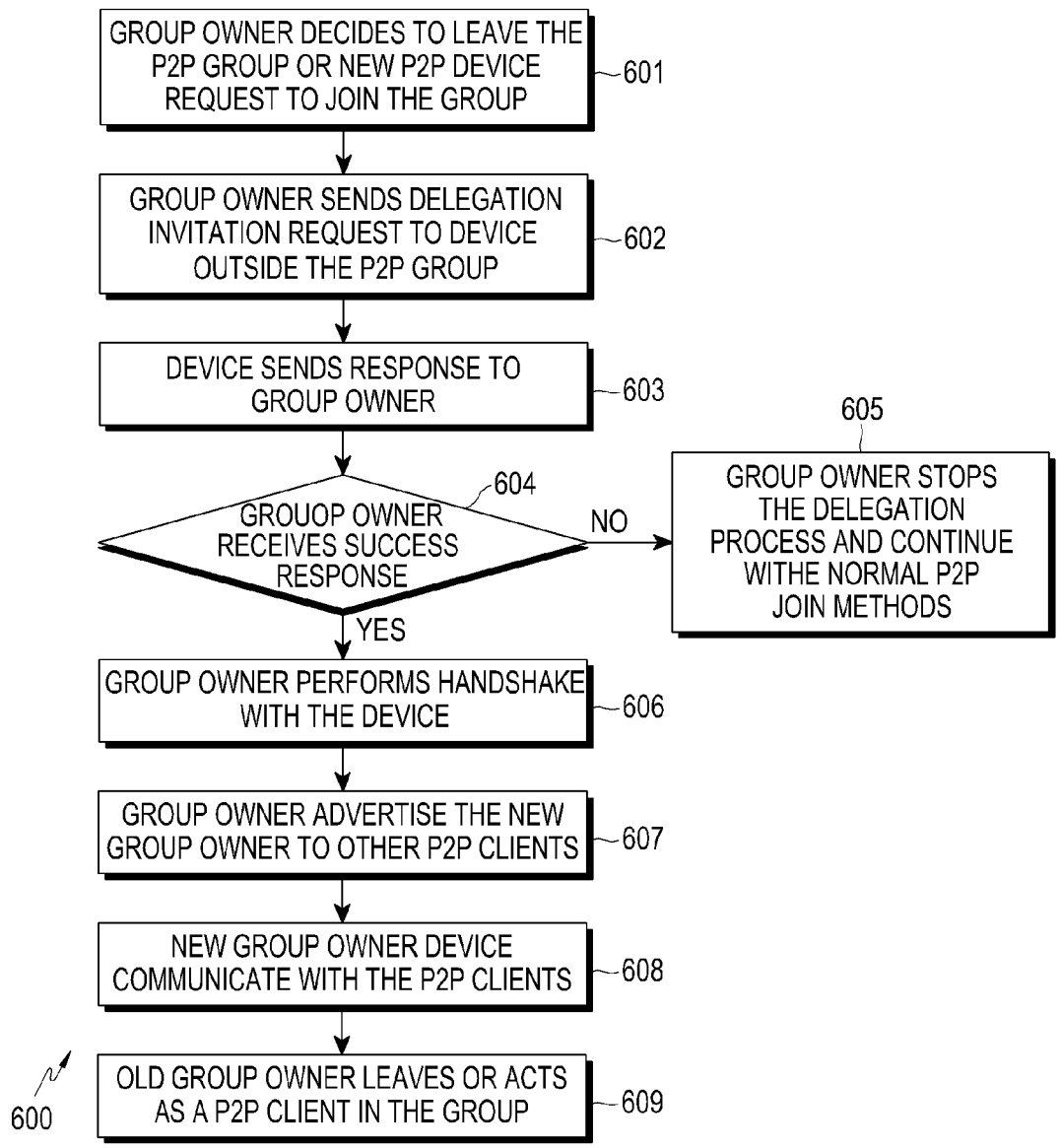
FIG. 6 is a flowchart illustrating a group owner delegation process for an outside device according to an embodiment of the present invention.

FIG. 6 is a flowchart illustrating a group owner delegation process for an outside device according to an embodiment of the present invention.

Referring to FIG. 6, in step 601, the process may initiate when either the group owner decides to leave the P2P group or a new P2P device requests to join the group. In either case, in step 602, the group owner sends a delegation invitation request to a device outside of the P2P group. The outside device sends response to the group owner, in step 603. If the group owner receives success response in step 604, which infers that the outside device accepts the delegation request sent by the group owner, the process continues to step 606. However, if the group owner receives failure response from the outside device, and the group owner stops the delegation process and continues with normal P2P join methods in step 605. In step 606, the group owner performs a handshake with the outside device, and in step 607, the group owner advertises the new group owner to other P2P clients in the network. In step 608, the new group owner device communicates (with the P2P clients. In step 609, the old group owner may either leave the group or remain in the group and act as a non-owner P2P client in the group. The new group owner will communicate with all the devices in the P2P network. According to embodiments of the present invention, various actions in method 600 may be performed in the order presented, in a different order, or simultaneously. Further, according to some embodiments of the present invention, some actions listed in FIG. 6 may be omitted.

Figure 7:
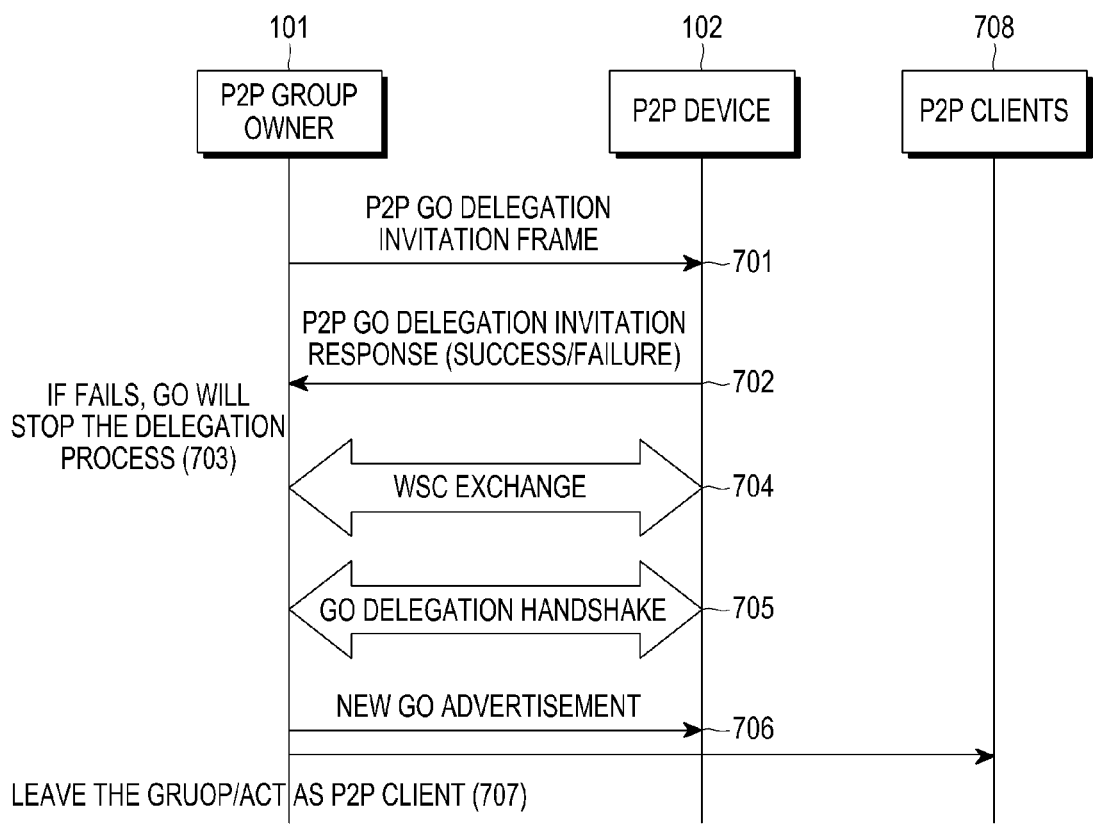
FIG. 7 is a diagram illustrating P2P group ownership delegation process for a new device outside the group according to an embodiment of the present invention.

FIG. 7 is a diagram illustrating a P2P group ownership delegation process to a new device outside the group according to an embodiment of the present invention.

Referring to FIG. 7, the Wi-Fi P2P group owner 101 communicates with an outside device 102 (i.e., a device not currently included in the P2P group) and sends a group owner delegation invitation frame to the outside device 102, in step 701. Upon receiving the delegation invitation, the outside device 102 sends a group owner delegation invitation response back to the P2P group owner 101, in step 702. If the group owner 101 receives a failure response, the group owner 101 stops the delegation process, in step 703. However, if the group owner 101 receives a successful invitation response, which means the outside device 102 accepts the group ownership delegation, the group owner 101 sends WSC exchange information to the outside device in step 704. The group owner 101 performs a delegation handshake with the new device in step 705. In step 706, the group owner 101 advertises the new group owner 102 to other devices 708 in the P2P network. In step 707, the old group owner 101, upon delegation of ownership may either leave the group or act as a non-owner P2P client within the group, in step 707. At the conclusion of the process, the new group owner 102 communicates with all of the P2P devices remaining in the group.

The group owner's delegation request and response frame follows the Public Action frame format as defined in IEEE Standard 802.11k and section 4.2.8 in Wi-Fi P2P specification.

According to an embodiment of the present invention, in addition to the existing Public action frames in section 4.2.8.1 in Wi-Fi P2P specification, additional frames are defined as in Table 1 below.

TABLE 1

| Type | Description |
| --- | --- |
| 0x09 | GO Delegation Intent request |
| 0x0A | GO Delegation Intent response |
| 0x0B | GO Delegation Confirmation Frame |
| 0x0C | GO Delegation Confirmation response Frame. |
| 0x0D | P2P GO Delegation Invitation frame |
| 0x0E | P2P GO Delegation response frame |

TABLE 1-continued

| Type | Description |
| --- | --- |
| 0x0F | GO Delegation Frame |
| 0x10 | GO Delegation Acknowledgement frame |
| 0x11 | GO Delegation announcement frame |

The Group Ownership delegation frames make use of the Information elements as mentioned in section 4.1 in Wi-Fi P2P specification. According to an embodiment of the present invention, in addition to the existing P2P attributes in the P2P IE formats, two additional attributes newly added are described in Table 2 below.

TABLE 2

| Attribute ID | Notes |
| --- | --- |
| 19 | P2P Client State Info |
| 20 | P2P Client Data Info |

The P2P Client State Info sub element contains the current status (power states) of each P2P client device present in the P2P group, as described in Table 3 and Table 4 below.

TABLE 3

| Field Name | Size (Octets) | Value | Description |
| --- | --- | --- | --- |
| Attribute ID | 1 | 19 | Identifying the type of P2P attribute |
| Length | 1 | Variable | Length of the Client state descriptor |
| P2P Client State descriptor(s) | Sum of all P2P client state descriptors | — | List of P2P client state descriptors. |

TABLE 4

| Field Name | Size (Octets) | Value | Description |
| --- | --- | --- | --- |
| Length | 1 | Variable | Length of the following fields |
| P2P device address | 6 | — | P2P device address |
| P2P Interface address | 6 | — | P2P Interface address. |
| State | 1 | 0—Awake 1—P2P-PS 2—P2P-WMM-PS | Power state of the P2P client device |

The client data info attribute contains the data that a P2P group owner has buffered for a particular P2P client in the P2P group as described in Table 5 and Table 6 below.

TABLE 5

| Field Name | Size (Octets) | Value | Description |
| --- | --- | --- | --- |
| Attribute ID | 1 | 20 | Identifying the type of P2P attribute |
| Length | 1 | Variable | Length of the Client state descriptor(s). |
| P2P Client Data descriptor(s) | Sum of all P2P client state descriptors | — | List of P2P client Data descriptors. |

TABLE 6

| Field Name | Size (Octets) | Value | Description |
| --- | --- | --- | --- |
| Length | 1 | Variable | Length of the following fields |
| P2P device address | 6 | — | P2P device address |
| P2P Interface address | 6 | — | P2P Interface address. |
| Data | Variable | — | P2P Client data. |

The Group Owner (GO) Delegation Intent request frame is a public action frame with action field set to 0x09 and Dialog token field set to non-zero value with the attributes mentioned in Table 7 below. This is a Broadcast frame sent by the GO to its entire P2P clients in order to get the GO delegation intent value.

TABLE 7

| Attributes | Attribute ID | Note |
| --- | --- | --- |
| P2P Capability | 2 | P2P capability attribute shall be present in the P2P IE |
| Configuration timeout | 5 | Configuration Timeout attribute shall present in the P2P IE. |
| Listen Channel | 6 | Channel attribute shall present in the P2P IE |
| P2P Device Info | 13 | Device Info attributes shall present in P2P IE. |
| P2P Group ID | 15 | P2P Group ID attribute shall present in the P2P IE. |

The GO Delegation Intent response frame follows the public action frame format in which the Action field is set to 0x0A and Dialog token field is set to a non-zero value that was received in the GO delegation intent request frame with the attributes mentioned in Table 8 below. This is a response from all P2P clients to the GO with the delegation intent value.

TABLE 8

| Attributes | Attribute ID | Note |
| --- | --- | --- |
| Status | 0 | Status attribute shall be present in the P2P IE. |
| Group Owner Intent | 4 | GO intent value will be present in the P2P IE. (Note: Tie Breaker Bit is ignored) |
| Configuration timeout | 5 | Configuration Timeout attribute shall present in the P2P IE. |
| P2P Group ID | 15 | P2P Group ID value shall be present in the P2P IE. |

The GO Delegation Confirmation Frame is a Public Action frame with Action field set to 0x0B and the Dialog token field set to non-zero value that was received in previous frames with the attributes mentioned in Table 9 below. This is a unicast frame send by the GO to the GO intent.

| Attributes | Attribute ID | Note |
| --- | --- | --- |
| Status | 0 | Status attribute shall be present in the P2P IE. |
| Group Owner Intent | 4 | GO intent value will be present in the P2P IE. (Note: Tie Breaker Bit is ignored) |

-continued

| Attributes | Attribute ID | Note |
|---|---|---|
| Configuration timeout | 5 | Configuration Timeout attribute shall present in the P2P IE. |
| P2P Group ID | 15 | P2P Group ID attribute shall present in the P2P IE. |

The GO Delegation Confirmation response Frame is a Public Action frame format in which the Action field is set to 0x0C and Dialog token field is set to a non-zero value that was received in previous frames with the attributes mentioned in Table 10 below. This is a unicast frame sent by the GO intent to the GO with the delegation accept or reject status.

TABLE 10

| Attributes | Attribute ID | Note |
|---|---|---|
| Status | 0 | Status attribute shall be present in the P2P IE. |
| P2P Device Info | 13 | Device Info attribute shall present in P2P IE. |
| P2P Group ID | 15 | P2P Group ID attribute shall present in the P2P IE. |

The P2P GO Delegation invitation frame is sent by Group owner to a P2P device that is not part of the P2P group. The Delegation Invitation frame is a public action frame format in which the action field is set to 0x0D and the Dialog token field is set to non-zero value with the attributes mentioned in Table 11 below. This is a unicast frame between the GO and the P2P device that is not the part of P2P Group.

TABLE 11

| Attributes | Attribute ID | Note |
|---|---|---|
| P2P Capability | 2 | P2P capability attribute shall be present in the P2P IE. |
| P2P Device ID | 3 | P2P device ID attribute shall be present in the P2P IE. |
| Configuration timeout | 5 | Configuration Timeout attribute shall present in the P2P IE. |
| Listen Channel | 6 | Channel attribute shall present in the P2P IE |
| P2P Group BSSID | 7 | P2P Group BSSID will be present in the P2P IE. |
| Intended P2P Interface address | 9 | Intended P2P interface address will be in the P2P IE. |
| Channel List | 11 | Channel List attribute shall present in the P2P IE. |
| P2P Device Info | 13 | Device Info attribute shall present in P2P IE. |
| P2P Group ID | 15 | P2P Group ID attribute shall be present in the P2P IE. |

The P2P GO Delegation Response Frame is a Public action frame format in which the Action field is set to 0x0E. The Dialog token field is set to non-zero value that was received during the P2P GO Delegation invitation frame with the attributes mentioned in Table 12 below. This is a unicast frame send by the P2P device (that is not the part of the P2P group) to the GO with the delegation accept or reject status.

TABLE 12

| Attributes | Attribute ID | Note |
|---|---|---|
| Status | 0 | Status attribute shall be present in the P2P IE. |
| P2P Capability | 2 | P2P capability attribute shall be present in the P2P IE. |

TABLE 12-continued

| Attributes | Attribute ID | Note |
|---|---|---|
| P2P Device ID | 3 | P2P device ID attribute shall be present in the P2P IE. |
| Configuration timeout | 5 | Configuration Timeout attribute shall present in the P2P IE. |
| Listen Channel | 6 | Channel attribute shall present in the P2P IE. |
| Channel List | 11 | Channel List attribute shall present in the P2P IE. |
| Intended P2P Interface Address | 9 | P2P Interface address attribute shall present in P2P IE (New GO P2P Interface Address). |
| P2P Device Info | 13 | Device Info attribute shall present in P2P IE. |

The P2P GO Delegation Frame is a Public Action frame with Action field set to 0x0F and the Dialog token field is set to a non-zero value that was received during previous frames with the attributes mentioned in Table 13 below. This is a unicast frame sent by the GO as the GO intent, which does actual delegation exchanges.

TABLE 13

| Attributes | Attribute ID | Note |
|---|---|---|
| Listen Channel | 6 | Channel attribute shall present in the P2P IE. |
| P2P Group BSSID | 7 | P2P Group BSSID will be present in the P2P IE. |
| Intended P2P Interface Address | 9 | P2P Interface address attribute shall present in P2P IE (New GO P2P Interface Address). |
| P2P Group Info | 14 | P2P Group Info attribute shall present in the P2P IE. |
| P2P Group ID | 15 | P2P Group ID attribute shall present in the P2P IE. |
| P2P Client State Info | 19 | Proposed new attribute to the existing P2P IEs |
| P2P Client Data Info | 20 | Proposed new attribute to the existing P2P IEs. |

The P2P GO Delegation Acknowledgement Frame is a Public action frame format in which the Action field is set to 0x10 and dialog token field is set to a non-zero value that was received during the previous frames with the attribute shown in Table 14 below. This is a unicast frame sent to the GO using the GO intent as an acknowledgement to the GO delegation process.

TABLE 14

| Attributes | Attribute ID | Note |
|---|---|---|
| Status | 0 | Status attribute shall be present in the P2P IE. |
| P2P Capability | 2 | P2P capability attribute shall be present in the P2P IE. |
| P2P Device ID | 3 | P2P device ID attribute shall be present in the P2P IE. |
| Configuration timeout | 5 | Configuration Timeout attribute shall present in the P2P IE. |
| Listen Channel | 6 | Channel attribute shall present in the P2P IE. |
| P2P Group BSSID | 7 | P2P Group BSSID will be present in the P2P IE. |
| P2P Device Info | 13 | Device Info attribute shall present in P2P IE. |
| P2P Group ID | 15 | P2P Group ID attribute shall present in the P2P IE. |
| P2P Interface | 16 | P2P Interface address attribute shall present in P2P IE (New GO P2P Interface Address). |

TABLE 14-continued

| Attributes | Attribute ID | Note |
|---|---|---|
| P2P Group Info | 14 | P2P Group Info attribute shall present in P2P IE. |

The GO Delegation Announcement Frame is a Public action frame with an action field set to 0x11 and the dialog token field is set to a non-zero value with the attributes shown in Table 15 below. This is a broadcast frame send by the GO to all of its P2P clients with the new P2P GO details.

TABLE 15

| Attributes | Attribute ID | Note |
|---|---|---|
| P2P Capability | 2 | P2P capability attribute shall be present in the P2P IE. |
| Configuration timeout | 5 | Configuration Timeout attribute shall present in the P2P IE. |
| Listen Channel | 6 | Channel attribute shall present in the P2P IE. |
| P2P Group BSSID | 7 | P2P Group BSSID will be present in the P2P IE. |
| Intended P2P Interface Address | 9 | P2P Interface address attribute shall present in P2P IE (New GO P2P Interface Address). |
| P2P Group ID | 15 | P2P Group ID attribute shall present in the P2P IE. |

Embodiments of the present invention described herein can be implemented through at least one software program running on at least one hardware device and performing network management functions to control the elements. The elements shown in FIG. 1 include blocks representing elements that can be at least one of a hardware device, or a combination of hardware device and software module.

While the invention has been shown and described with reference to certain embodiments thereof, it will be understood by those skilled in the art that various changes in form and details may be made therein without departing from the scope of the invention as defined by the appended claims and their equivalents.

What is claimed is:

1. A method for exiting, by a peer owner, a Wireless Fidelity (Wi-Fi) peer-to-peer network including the peer owner and a plurality of client devices, the method comprising:
delegating ownership of the peer-to-peer network from the peer owner to a new owner from among the plurality of client devices, wherein delegating the ownership comprises:
broadcasting an intent request to the plurality of client devices indicating an intent to delegate ownership of the peer-to-peer network;
receiving responses to the intent request from the plurality client devices;
determining the new owner from among the plurality of client devices according to the received responses;
sending a delegation request to the new owner; and
transferring ownership of the peer-to-peer network to the new owner; and
exiting the network after delegating the ownership to the new owner.

2. The method of claim 1, wherein broadcasting the intent request includes sending delegation intent request frames to the plurality of client devices.

3. The method of claim 1, wherein the responses to the intent request include information indicating capabilities of each respective client device.

4. The method of claim 1, wherein determining the new owner comprises:
obtaining a maximum intent value from among intent values received from the plurality of client devices; and
determining a client corresponding to the maximum intent value as the new owner.

5. The method of claim 4, wherein determining a client corresponding to the maximum intent value comprises:
when there are at least two intents values equal to the maximum intent value determining as the new owner a client having a maximum value of Media Access Control (MAC) addresses of the at least two devices corresponding to the maximum intent value.

6. The method of claim 1, wherein transferring ownership of the peer-to-peer network comprises sending, to the new owner, information including at least one of Dynamic Host Configuration Protocol (DHCP) server details, a peer-to-peer address, a group id, and a client state.

7. The method of claim 1, further comprising sending, to the plurality of client devices, an advertisement indicating the transference of ownership to the new owner.

8. A Wireless Fidelity (Wi-Fi) peer-to-peer network comprising:
a plurality of client devices; and
an owner device for delegating ownership of the peer-to-peer network to a new owner from among the plurality of client devices before exiting the Wi-Fi peer-to-peer network, wherein delegating the ownership of the peer-to-peer network comprises:
broadcasting an intent request to the plurality of client devices;
receiving responses to the intent request from the plurality of client devices;
determining the new owner from among the plurality of client devices according to the received responses;
sending a delegation request to the new owner; and
transferring ownership of the peer-to-peer network to the new owner.

9. The Wi-Fi peer-to-peer network of claim 8, wherein broadcasting the intent request includes broadcasting delegation intent request frames to the plurality of client devices.

10. The Wi-Fi peer-to-peer network of claim 8, wherein the responses to the intent request include information indicating capabilities of each respective client device.

11. The Wi-Fi peer-to-peer network of claim 8, wherein determining the new owner includes obtaining a maximum intent value from among intent values received from the plurality of client devices, and determining a client corresponding to the maximum intent value as the new owner.

12. The Wi-Fi peer-to-peer network of claim 11, wherein determining a client corresponding to the maximum intent value, includes, when the intent values of at least two of the plurality of client devices correspond to the maximum intent value, a client device having a maximum Media Access Control (MAC) addresses of the at least two devices corresponding to the maximum intent value is determined as the new owner.

13. The Wi-Fi peer-to-peer network of claim 8, wherein transferring ownership of the peer-to-peer network includes sending, to the new owner, information including at least one of Dynamic Host Configuration Protocol (DHCP) server details, a peer-to-peer address, a group id, and a client state.

14. The Wi-Fi peer-to-peer network of claim 8, wherein the owner device sends, to the plurality of client device, an advertisement indicating the transference of ownership to the new owner.

15. The Wi-Fi peer-to-peer network of claim 8, wherein the owner device establishes peer-to-peer group communications with the plurality of client devices.

* * * * *